UNITED STATES PATENT OFFICE 2,390,395

SORBITAN AND PROCESS FOR MAKING THE SAME

Sol Soltzberg, Tamaqua, Pa., assignor to Atlas Powder Company, Wilmington, Del., a corporation of Delaware No Drawing. Application April 15, 1941,
Serial No. 388,645

6 Claims. (Cl. 260—345)

The present invention relates to crystalline sorbitan and a process for making it.

An object of the invention is to provide a new pure crystalline sorbitan.

Another object is the production of this sorbitan from sorbitol by a cheap convenient method.

A further object is to convert sorbitol into two products, the new crystalline sorbitan and a non-crystalline syrupy mixture comprising largely other sorbitol anhydrides, by a single, practicable process.

The above and other objects will become apparent from the following description and claims.

Sorbitol is a straight-chain, six-carbon-atom, hexahydric alcohol of the class generically called hexitols. Sorbitol can have one mol of water removed to form a monoanhydro sorbitol or sorbitan. Theoretically a number of isomeric sorbitans might be made. Actually, so far as I am aware, two crystalline sorbitans have been described and synthesized heretofore, one of them also having been found in a natural source.

A sorbitan was prepared by Fischer and Zach (Ber. 45, 2068) by the sodium amalgam reduction of 3,6 anhydroglucose. The sorbitan was the 3,6 sorbitan melting at 113° C. and having an optical rotation in water $\alpha_d^{25°} = -7.47°$. The process is highly expensive and cumbersome and completely unsuited to commercial use.

The other sorbitan was first found in nature as polygalitol and was also synthesized by Zervas (Ber. 63B, 1689) by the hydration of tetracetyl glucal. This sorbitan was the 1,5 which melts at 140-141° C. and has an optical rotation in water $\alpha_d^{20°} = +42.4°$. The natural source is very poor in polygalitol and the described synthetic method entirely impracticable as a commercial process.

I have found a new sorbitan which can be prepared readily and cheaply in a pure crystalline form from commercially available sorbitol. My sorbiton melts at 111°-112° C. and has an optical rotation in water $\alpha_d^{25°} = -20°$. I believe this new product to be 1,4 sorbitan of the formula:

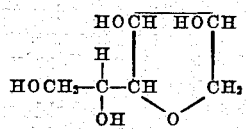

The exact structure of this particular sorbitan, however, is not an essential part of my invention but merely describes the compound in accordance with my best understanding at the present time.

The compound of this invention is capable of production by methods which place it in the class of commercial chemicals as distinguished from laboratory curiosities to which class the previously known sorbitans belong.

The sorbitan of this invention is soluble in water, methanol, ethanol, and isopropanol, but insoluble at room temperatures in butyl or higher alcohols, in dioxane, ether, aromatic hydrocarbons, ethyl acetate, chloroform and carbon tetrachloride. Due to its pure form and ready availability it is particularly adapted for the synthesis of specific homogeneous derivatives such as esters of organic and inorganic acids, ethers and acetals, etc., for use in pharmaceuticals, fixatives, plasticizers, emulsifiers, fine chemicals, etc.

While the sorbitan of my invention can be prepared by various synthetic methods, I have discovered a simple and economical process for preparing and isolating it from sorbitol which is a readily available commercial chemical.

According to my invention, sorbitol is treated to remove one mol of water by heating in the presence of a specific acidic anhydridizing catalyst. Sulfuric acid, or other non-oxidizing strong acid, such as phosphoric, hydrochloric, or an arylsulfonic acid, may be used. Of these, sulfuric acid is to be preferred, from the standpoint of product yield and ease of removal.

The ratio of acid to sorbitol is not critical, but I prefer to operate in the neighborhood of 1% acid by weight.

The dehydration proceeds best under reduced pressure, and at elevated temperatures, such as 125°-150° C.

The anhydridizing process yields a mixture of monoanhydro sorbitols rich in the 1,4-sorbitan, which compound may then be recovered from the mixture in various ways.

In one recovery process, the reaction mixture is diluted to a suitable concentration with water, decolorized with an adsorbent activated carbon such as Darco, the acid neutralized to form an insoluble salt which is filtered out, the filtrate concentrated, and allowed to crystallize at ordinary temperatures for two or three days. The crystalline sorbitan is recovered from the resulting magma by triturating with ethanol and filtering. The crude product can be used in this form or may be purified by recrystallizing from isopropanol or other lower alcohol.

Once a quantity of crystalline sorbitan is available, the concentrated solutions can be seeded therewith to hasten crystallization instead of waiting for spontaneous crystal growth.

While the purification steps are desirable to obtain optimum yields, they are not essential, and useful recoveries of the 1,4-soribtan can be achieved by heavily seeding a supersaturated aqueous solution of the mixed reaction mixture with seed crystals of the desired product, allowing crystallization to proceed in the magma, recovering the solids by trituration with and recrystallization from a lower alcohol, preferably isopropanol. The function of the purification steps before crystallization is to remove crystallization inhibitors. The activated carbon or other adsorbent of the decolorizing type appears to remove colloidal crystallization inhibitors.

Instead of aqueous crystallization, the reaction mixture can be taken up directly with warm methanol, ethanol or isopropanol, the solution cooled, seeded with crystals of the desired product, and allowed to crystallize. The 1,4 sorbitan crystals can be removed from the magma. The non-crystalline residue, after removal of the solvent alcohol, can be heated to yield a mixture of sorbitol dianhydrides, with loss of one more mol of water, or the residue can be used as such after decolorizing, neutralizing and removing inorganic constituents as described.

When the non-crystalline monoanhydride mixture is to be recovered, the decolorizing and deashing steps are preferably carried out before the separation of the 1,4-sorbitan, in the interest of higher yield and easier purification, since the decolorizing carbon usually works better in aqueous than in alcoholic solution. Also, carbon treatment is preferably carried out in acid, rather than in neutral solution, for the same reason.

When sulfuric acid is used, it can be removed conveniently as the calcium or barium salt, in aqueous solution. With other anions, such as the chloride, where water-insoluble salts are not so convenient to use, it is preferable to neutralize with a cheap base, such as sodium or calcium hydroxide or carbonate, evaporate to minimum water content, and extract the organic portion with alcohol. Partial separation of salt and sorbitan may be achieved by selective crystallization from water, but since alcohol is preferably used anyway in the subsequent purification of the 1,4-sorbitan, the use of that solvent is also to be preferred for deashing.

Various modifications of this process will be apparent to those skilled in this art. The following is an illustration of a concrete embodiment of my process, it being understood that the invention is not limited thereto.

Example 100 parts of pure crystalline sorbitol and 1 part of concentrated sulfuric acid were heated at 140° C., under a reduced pressure of 150 to 200 mm. mercury, for 35 minutes, until substantially 1 mol of water had been split out of the sorbitol. The reaction product was then cooled. The product was diluted to about 60% concentration with water and the solution treated with decolorizing carbon, until colorless. The sulfuric acid was then neutralized with sodium hydroxide and the neutral liquor evaporated to throw out the sodium sulfate, which was filtered off from the hot concentrated aqueous syrup. The syrup was set aside to crystallize at 20 to 25° C. for 48 hours. The resulting crystalline magma was triturated with ethanol, filtered and the crude crystalline sorbitan recrystallized from isopropanol. The product was 1,4 sorbitan which melted at 111–112° C. and had optical activity $a_d^{25°} = -20°$.

The yield of crystallizable 1,4-sorbitan from the anhydridizing reaction and crystallization described depends very largely on the initial purity of the sorbitol. With substantially pure sorbitol I can obtain yields of 30% and upwards operating as in the example. For this reason I prefer to start with sorbitol of at least 90% purity and preferably higher.

The acid catalyzed anhydridization of sorbitol yields not only the presently claimed sorbitan (which I believe to be the 1,4) but also a mixture composed chiefly of other anhydro-sorbitols.

The syrup remaining after the crystallization of 1,4 sorbitan from the reaction mixture of the acid catalyzed anhydridization of sorbitol is in itself a useful product. It is obtained in the form of a non-crystalline syrupy liquid which can be used as such for its physical properties of hygroscopicity and non-volatility as a humectant, softener or plasticizer for tobacco, glues, dextrin, cellulosic materials, and the like. Chemically the syrup is composed of hydroxylated compounds principally other anhydro-products of sorbitol. From the syrup there can be made by conventional reactions a series of esters, resins, acetals, ketals, ethers, and various other substitution products of utility as plasticizers, solvents, perfume fixatives, emulsifiers and textile assistants.

Having described my invention what is claimed is:

1. The crystalline 1,4-sorbitan of melting point 111° to 112° C. and optical rotation in water $a_d^{25°}$ substantially $-20°$.

2. The process which comprises heating sorbitol of not less than 90% purity, in the presence of a mineral acid, until only 1 mol of water is removed therefrom, diluting the product with water, purifying the product with activated carbon, neutralizing the said acid, dissolving the solution in a monohydric alcohol of not more than 3 carbon atoms, removing the salt formed by neutralizing the acid not later than after said dissolving step, seeding the alcoholic solution with 1,4 sorbitan crystals, and crystallizing 1,4 sorbitan from said alcoholic solution.

3. The process which comprises heating sorbitol of not less than 90% purity to 125° to 150° C. at reduced pressure and in the presence of a mineral acid catalyst until only 1 mol of water is removed from the sorbitol, purifying the product with decolorizing carbon, neutralizing said acid and removing the salt so formed, and crystallizing 1,4 sorbitan from the neutral purified product.

4. The process which comprises heating sorbitol of not less than 90% purity to 125° to 150° C. at reduced pressure and in the presence of a small amount of sulfuric acid until only 1 mol of water is removed from the sorbitol, purifying the product with decolorizing carbon, neutralizing said acid and removing the salt so formed, and crystallizing 1,4 sorbitan from the neutral purified product.

5. The process which comprises heating sorbitol of not less than 90% purity to 125° to 150° C. at reduced pressure in the presence of a minor percent of sulfuric acid until only 1 mol of water is removed from the sorbitol, diluting the product with water to a workable viscosity, purifying the solution with decolorizing carbon, neutralizing the sulfuric acid with a base, concentrating the neutral solution, removing the salt formed by neutralizing the acid not later than after said concentrating step, allowing the said neutral solution to crystallize at least partially, triturating the magma of solution and crystals in a monohydric alcohol of not more than 3 carbon atoms, and filtering the 1,4 sorbitan from the alcohol solution.

6. The process for preparing crystalline 1,4 sorbitan which comprises heating sorbitol of not less than 90% purity at about 140° C. under reduced pressure and in the presence of about 1% of sulfuric acid until only 1 mol of water has been split out of the sorbitol, diluting the product with water, purifying the resulting solution with decolorizing carbon, neutralizing the sulfuric acid with sodium hydroxide, concentrating the neutralized solution to crystallize sodium sulfate, separating the solution from said sodium sulfate, cooling the solution and allowing 1,4 sorbitan to crystallize, triturating the resulting magma with a monohydric alcohol of not more than 3 carbon atoms, separating the sorbitan crystals from the alcohol solution, and recrystallizing the sorbitan from a monohydric alcohol of not more than 3 carbon atoms.

SOL SOLTZBERG.